United States Patent
Abbasipour et al.

(10) Patent No.: US 11,226,829 B2
(45) Date of Patent: Jan. 18, 2022

(54) TRIGGER CORRELATION FOR DYNAMIC SYSTEM RECONFIGURATION

(71) Applicants: Mahin Abbasipour, Montreal (CA); Maria Toeroe, Montreal (CA); Ferhat Khendek, Montreal (CA)

(72) Inventors: Mahin Abbasipour, Montreal (CA); Maria Toeroe, Montreal (CA); Ferhat Khendek, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 211 days.

(21) Appl. No.: 16/623,470

(22) PCT Filed: Dec. 21, 2017

(86) PCT No.: PCT/IB2017/058314
§ 371 (c)(1),
(2) Date: Dec. 17, 2019

(87) PCT Pub. No.: WO2019/016584
PCT Pub. Date: Jan. 24, 2019

(65) Prior Publication Data
US 2020/0117480 A1    Apr. 16, 2020

Related U.S. Application Data

(60) Provisional application No. 62/533,404, filed on Jul. 17, 2017.

(51) Int. Cl.
*G06F 9/54*    (2006.01)
*G06F 9/445*   (2018.01)

(52) U.S. Cl.
CPC .......... *G06F 9/44505* (2013.01); *G06F 9/542* (2013.01)

(58) Field of Classification Search
CPC .. G06F 9/4411; G06F 9/44505; G06F 9/4812; G06F 9/542
(Continued)

(56) References Cited

U.S. PATENT DOCUMENTS 9,300,552 B2 * 3/2016 Dube .................. G06F 8/77
10,511,691 B2 * 12/2019 Sala ................. H04L 41/142
(Continued)

FOREIGN PATENT DOCUMENTS

WO    2017028907 A1    2/2017

OTHER PUBLICATIONS

A. Verma et al, CosMig: Modeling the Impact of Reconfiguration in a Cloud, 19th Annual IEEE International Symposium on Modelling, Analysis, and Simulation of Computer and Telecommunication Systems, 2011, 10 pages.
B. Gruschke, Integrated Event Management: Event Correlation Using Dependency Graphs, Presented at: DSOM'98, 12 pages.
(Continued)

*Primary Examiner* — Andy Ho
(74) *Attorney, Agent, or Firm* — Julie Dufort; Ericsson Canada Inc.

(57) ABSTRACT

A system is reconfigured at runtime when triggers are issued in response to events taking place in the system. The triggers, which are issued on configuration entities, are correlated by transferring relations of the configuration entities to relations of the triggers to thereby identify related triggers. Elasticity rules are selected for the triggers, where the elasticity rules specify actions for resource allocation or deallocation at runtime. Selected actions of the selected elasticity rules for the related triggers are executed to reconfigure the system according to a set of action correlation meta-rules which provide an ordering of the actions.

22 Claims, 14 Drawing Sheets

(58) Field of Classification Search
USPC .......................................... 719/318; 713/100
See application file for complete search history.

(56) References Cited

U.S. PATENT DOCUMENTS

2014/0280956 A1* 9/2014 Shu .................... H04L 41/0893
709/226
2018/0176089 A1* 6/2018 Ritter ................. H04L 41/0823

OTHER PUBLICATIONS

B. Konig et al, Elastic monitoring framework for cloud infrastructures, www.ietdl.org, IET Commun. 2012, vol. 6, Iss. 10, pp. 1306-1315.
C. Wang et al, Fine-Grained Resource Scaling in a Public Cloud: A Tenant's Perspective, 2016 IEEE 9th International Conference on Cloud Computing, 8 pages.
M. Maurer et al, Adaptive resource configuration for Cloud infrastructure management, Elsevier, Future Generation Computer Systems 29 (2013), pp. 472-487.
M. Sedaghat et al, A Virtual Machine Re-packing Approach to the Horizontal vs. Vertical Elasticity Trade-off for Cloud Autoscaling, CAC' 13, Aug. 5-9, 2013, Miami, FL, USA. 10 pages.
M. Steinder et al, The present and future of event correlation: A need for end-to-end service fault localization, in World Multi-Conf. Systemics, Cybernetics and Informatics, Orlando 2001, 6 pages.
P. Tang et al, Efficient Auto-scaling Approach in the Telco Cloud using Self-learning Algorithm, 2015 IEEE, 6 pages.
Plumgrid Broadcom, Container and OpenStack Traffic Monitoring with Broadview™ Instrumentation and PLUMgrid CloudApex, 2016 PLUMgrid, GAS318_v1.0_0916, 4 pages.
R.S. Shariffdeen et al, Workload and Resource Aware Proactive Auto-Scaler for PaaS Cloud, 2016 IEEE 9th International Conference on Cloud Computing, 2016.10, 8 pages.
S.A. Yemini et al, High Speed and Robust Event Correlation, EEE Communications Magazine, May 1996, 9 pages.
Z. Shen et al, CloudScale: Elastic Resource Scaling for Multi-Tenant Cloud Systems, SOCC'11, Oct. 27-28, 2011, Cascais, Portugal, 14 pages.
ISR and Written Opinion from corresponding application PCT/IB2017/058314.

* cited by examiner

TRIGGER CORRELATION FOR DYNAMIC SYSTEM RECONFIGURATION

CROSS-REFERENCE TO RELATED APPLICATIONS

This application claims the benefit of U.S. Provisional Application No. 62/533,404 filed on Jul. 17, 2017, the entire contents of which are hereby incorporated by reference.

TECHNICAL FIELD

Embodiments of the disclosure relate generally to systems and methods for network service design.

BACKGROUND

A Service Level Agreement (SLA) is a contract between a service provider and a customer that describes the service quality the provider agrees to deliver to the customer. The level of service availability is part of the SLA and is defined as the percentage of time the service is provided to the users. Mission critical and telecom services are required to be highly available, i.e. 99.999% of the time available.

One of the goals of service providers is to minimize system's resource usage while ensuring that the SLAs are met to avoid penalties. To meet the required quality of services and optimize resource utilization, the system is monitored continuously and reconfigured periodically and dynamically according to workload variations and pre-defined patterns. This basically consists of adjusting the system's processing power by adding or removing software instances contained in e.g. a virtual machine (VM) or scaling up/downsizing a VM. In cloud computing this is commonly known as elasticity. To track workload variations, the system is monitored, different metrics are collected and periodically assessed with respect to the SLAs. Whenever a dynamic reconfiguration is required because of potential SLA violation or low resource utilization, one or more triggers are generated. These triggers invoke the elasticity rules that reconfigure the system based on the system's current situation and the trigger received.

Depending on the situation multiple triggers may be generated simultaneously. One may be tempted to handle each trigger separately. However, the triggers may be related, and handling them separately may lead to serious problems. For example, assume that two triggers t1 and t2 invoke two opposite elasticity rules e1 and e2, respectively, where e1's action is to remove a node and e2's action is to add a node. If the triggers are handled separately, resource oscillation will occur. In cloud systems, due to the existence of multiple layers (infrastructure, platform and application layer), one root cause may generate multiple triggers in the different layers. For example, some workload decrease at the application layer may cause triggers at the application layer as well as triggers at the infrastructure layer. If these triggers are considered separately, the corresponding elasticity rules may remove some critical resources twice and this may jeopardize the availability of the service.

To correlate triggers, a number of solutions have been proposed in the literature but not with respect to elasticity. In these studies, a trigger is issued to signal an error caused by a fault in an entity of the system. As an error may propagate throughout the system, a large number of errors and therefore symptom triggers may be generated. These solutions aim at eliminating the symptoms and identifying the root cause, i.e. the fault in the system. When the root cause is identified, appropriate actions are taken.

SUMMARY

In one embodiment, there is provided a method for reconfiguring a system at runtime when triggers are issued in response to events taking place in the system. The method comprises: correlating the triggers by transferring relations of configuration entities on which the triggers are issued to relations of the triggers to thereby identify related triggers. The method further comprises: selecting elasticity rules for the triggers, wherein the elasticity rules specify actions for resource allocation or deallocation at runtime; and executing selected actions of the selected elasticity rules for the related triggers to reconfigure the system according to a set of action correlation meta-rules which provide an ordering of the actions.

In another embodiment, there is provided a network node comprising processing circuitry and memory. The memory contains instructions executable by the processing circuitry to reconfigure a system at runtime when triggers are issued in response to events taking place in the system. The network node is operative to: correlate the triggers by transferring relations of configuration entities on which the triggers are issued to relations of the triggers to thereby identify related triggers; select elasticity rules for the triggers, wherein the elasticity rules specify actions for resource allocation or deallocation at runtime; and execute selected actions of the selected elasticity rules for the related triggers to reconfigure the system according to a set of action correlation meta-rules which provide an ordering of the actions.

In yet another embodiment, there is provided a network node operable to reconfigure a system at runtime when triggers are issued in response to events taking place in the system. The network node comprises: a trigger correlation module adapted to correlate the triggers by transferring relations of configuration entities on which the triggers are issued to relations of the triggers to thereby identify related triggers; a selection module adapted to select elasticity rules for the triggers, wherein the elasticity rules specify actions for resource allocation or deallocation at runtime; and an action execution module adapted to execute selected actions of the elasticity rules for the related triggers to reconfigure the system according to a set of action correlation meta-rules which provide an ordering of the actions.

In yet another embodiment, there is provided a method for reconfiguring a system at runtime when triggers are issued in response to events taking place in the system. The method comprises initiating an instantiation of a server instance in a cloud computing environment which provides processing circuitry and memory for running the server instance. The server instance is operative to: correlate the triggers by transferring relations of configuration entities on which the triggers are issued to relations of the triggers to thereby identify related triggers; select elasticity rules for the triggers, wherein the elasticity rules specify actions for resource allocation or deallocation at runtime; and execute selected actions of the elasticity rules for the related triggers to reconfigure the system according to a set of action correlation meta-rules which provide an ordering of the actions.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DETAILED DESCRIPTION

Figure 1:
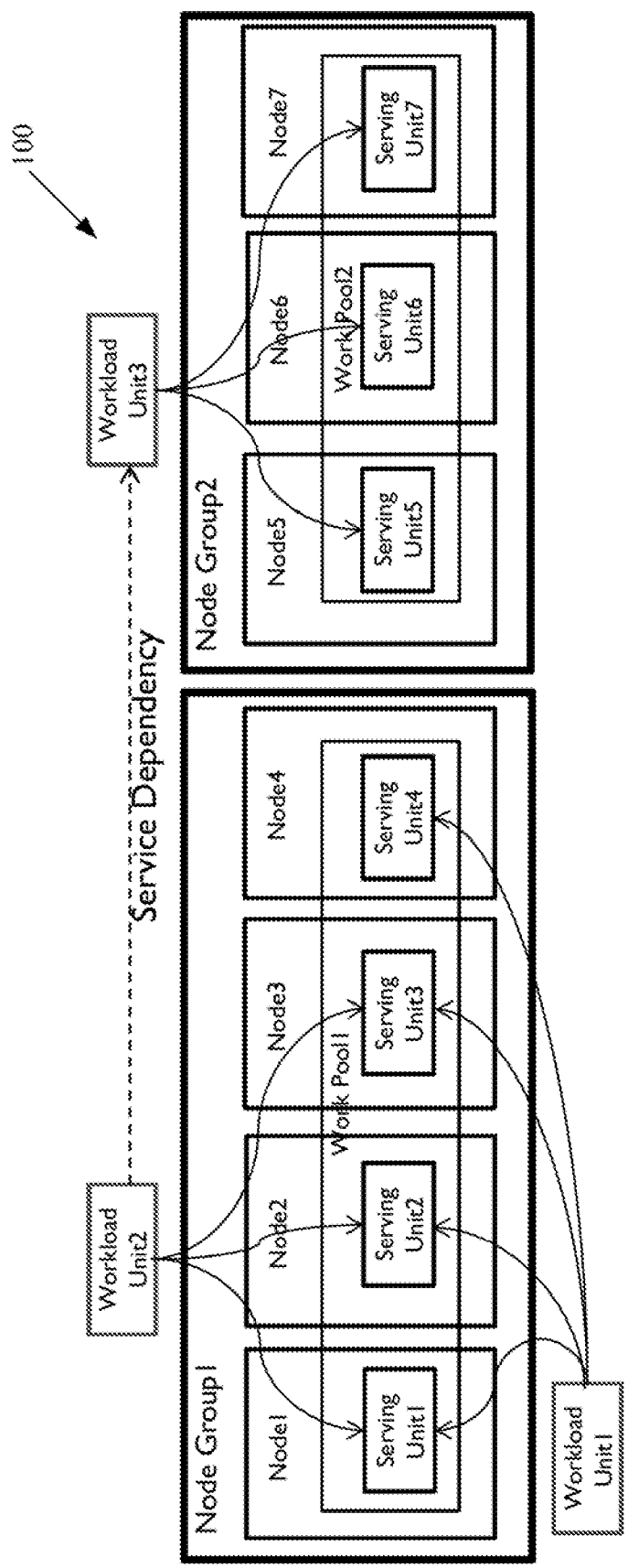
FIG. 1 illustrates an example configuration at runtime according to one embodiment.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

A model based approach is presented for runtime correlation of triggers, as well as the coordinated execution of their related elasticity rules and actions. This approach is part of an overall framework for SLA compliance management and dynamic reconfiguration of a system. The model based approach includes a number of steps. In the first step, triggers issued on related configuration entities are correlated and the result is represented as a set of relation graphs. The nodes of the relation graphs are the triggers and the edges are the relations, which can be of different types such as service or protection dependency, physical or logical containment, assignment relationship and adjacency. For each trigger, an applicable elasticity rule is then selected. To coordinate the actions of the elasticity rules of related triggers, a set of action correlation meta-rules are also defined.

In prior studies, the term "trigger correlation" refers to correlation of faults in the context of fault management of distributed systems and networks. An error caused by a fault (e.g. a software bug) may propagate through many related objects and a large volume of triggers may be received. Prior "trigger correlation" solutions aim at a completely different problem, which is to eliminate the symptoms of malfunction and identify the underlying faults in the system. These solutions do not attempt at coordinating elasticity actions.

The proposed approach not only includes adding or removing resources but also reorganizing the resources for better resource utilization when needed, while taking into account the availability of the services. For this a configuration is generated, considering the maximum workload to be provided by the system. The deployed system however is dimensioned initially to an average workload. At the configuration design time, elasticity rules which govern the dynamic reconfiguration of the system are generated. Dynamic reconfiguration is a mechanism for rearranging, allocating and deallocating resources as workload varies. Rearranging, adding or deallocating resources are performed by actions according to elasticity rules invoked by certain conditional events, such as threshold violations also known as triggers. In this disclosure, a trigger is issued due to an entity's workload changes to invoke elasticity rules for resource allocation or deallocation. The proposed approach coordinates resource allocations and deallocations for related entities.

Systems are described and managed through configurations. A configuration describes the software and/or hardware entities, their corresponding types, the types of the services provided by the entities, and their relationships. In this configuration, a system is viewed from two perspectives: service side and service provider side. Entities in the service perspective are workload units. A workload unit represents a chunk of workload associated with the provisioning of a service. Service provider entities are software and/or hardware entities which collaborate to provide the service. In this disclosure, software entities are represented as serving units hosted by computing nodes (e.g. the hardware entities or virtual machines hosted on the hardware entities). To provide services, workload units are assigned to the serving units at runtime.

In order to provide and protect highly available services, entities are deployed in a redundant manner. Two or more serving units form a work pool. A node group is used to host the serving units of a work pool. Depending on the redundancy model, a workload unit may have one or more active assignments and zero or more standby assignments to different serving units of a work pool. A serving unit with an active assignment provides the service represented by the workload unit. A serving unit with a standby assignment does not provide the service, but it is ready to become active for the workload unit in a minimum amount of time.

In case of a failure in the serving unit with an active assignment, a redundant serving unit(s) from the work pool take(s) over the service provisioning to minimize service outage. The assignment of workload units to serving units is dynamic and changes at runtime.

The proposed approach is applicable in the context of the Service Availability Forum (SAForum) and in any other domain where the service and service provider perspectives are described explicitly in the configuration.

In the following discussion, it is assumed that the software for handling a maximum workload for the system is installed at deployment time and/or available anywhere that the software may be executed. Therefore, no software installation is needed at reconfiguration time. When the workload is not at its maximum, spare serving units are not assigned any workload units and may be terminated to reduce resources/power consumption. When the workload increases and more serving units are needed to provide the service, the spare serving units are instantiated and assigned workloads as needed.

FIG. 1 illustrates an example configuration at runtime of a service-providing system 100 according to one embodiment. In this configuration, there are two work pools (Work Pool1 and Work Pool2) which are protecting three workload units (Workload Unit1, Workload Unit2 and Workload Unit3). The serving units of Work Pool1 can be hosted only on the nodes of Node Group1 (Node1, Node2, Node3 and Node4) and the serving units of Work Pool2 can be hosted only on Node5, Node6 and Node7 composing Node Group2. Each node may be a hardware entity or virtual machines hosted on a hardware entity. As shown in FIG. 1 with the service dependency relation, the provisioning of the service represented by Workload Unit2 depends on the provisioning of the service represented by Workload Unit3. In this example, each assignment of Workload Unit2 requires one assignment of Workload Unit3.

Figure 2:
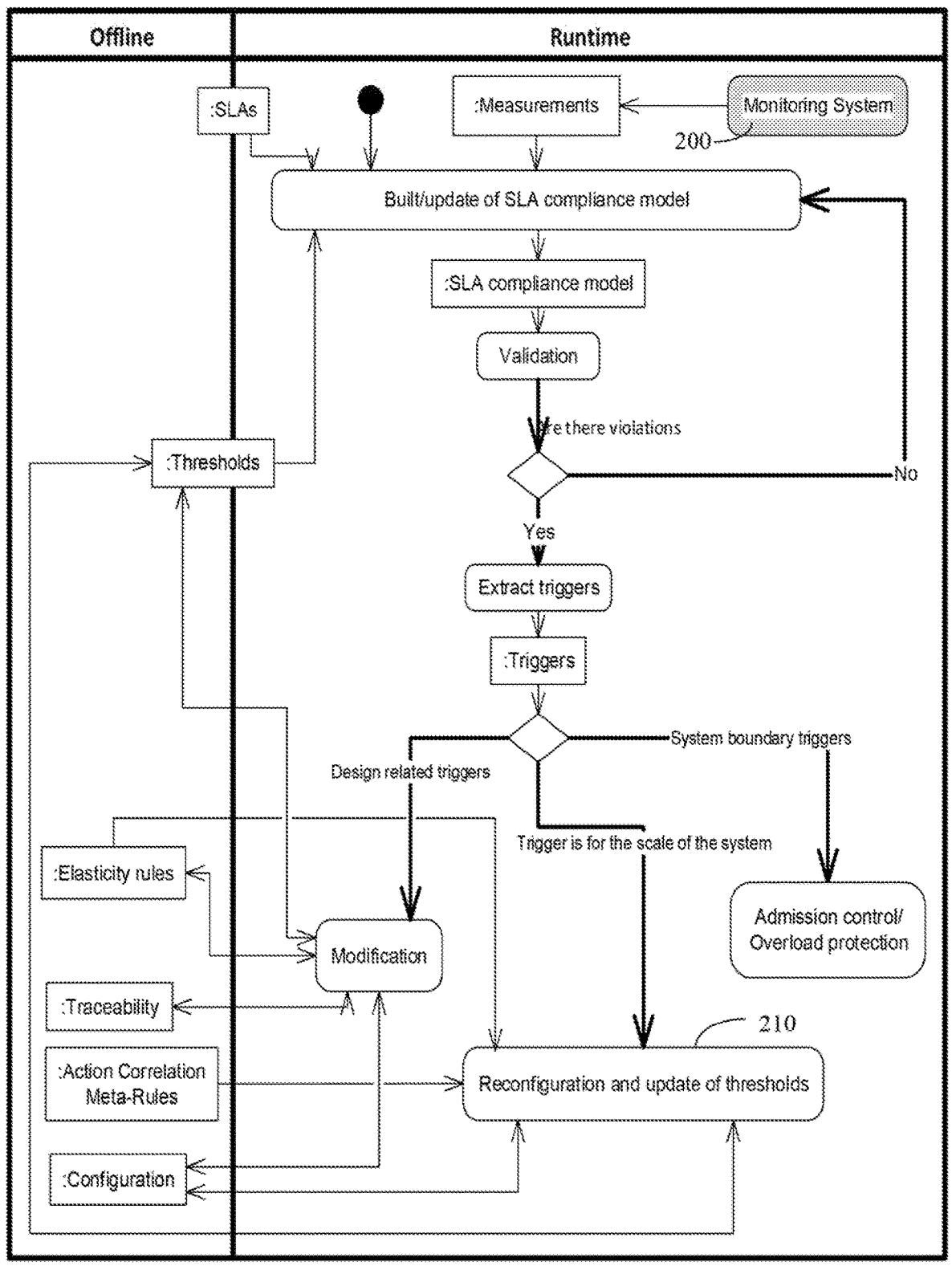
FIG. 2 shows an overall framework for the management of SLA compliance and dynamic reconfiguration according to one embodiment.

FIG. 2 shows an overall framework for the management of SLA compliance and dynamic reconfiguration according to one embodiment. The framework manages the resource provisioning at runtime of a system (e.g. the system 100 of FIG. 1) in a proactive manner to avoid SLAs violation. The left-hand side of FIG. 2 shows offline artifacts: the predefined action correlation meta-rules model and the models generated during the configuration generation process. These models are reused at runtime to derive the reconfiguration of the system. The monitoring system 200 monitors the system 100 for SLA compliance. Based on the measurements of the monitoring system 200 and the current thresholds, the periodic validation of the SLA compliance model may generate triggers for reconfiguration. Depending on the thresholds violated in the SLA compliance model, the generated triggers can be of different types: triggers for scaling the system, design related triggers and system boundary triggers. If the triggers are of the first type, the system will be scaled based on the current configuration, the generated elasticity rules and the defined meta-rules for action correlation. With the scaling/reconfiguration of the system, the values of the thresholds are also updated. The following description focuses on the first type of triggers, i.e. triggers for system scaling.

Figure 3:
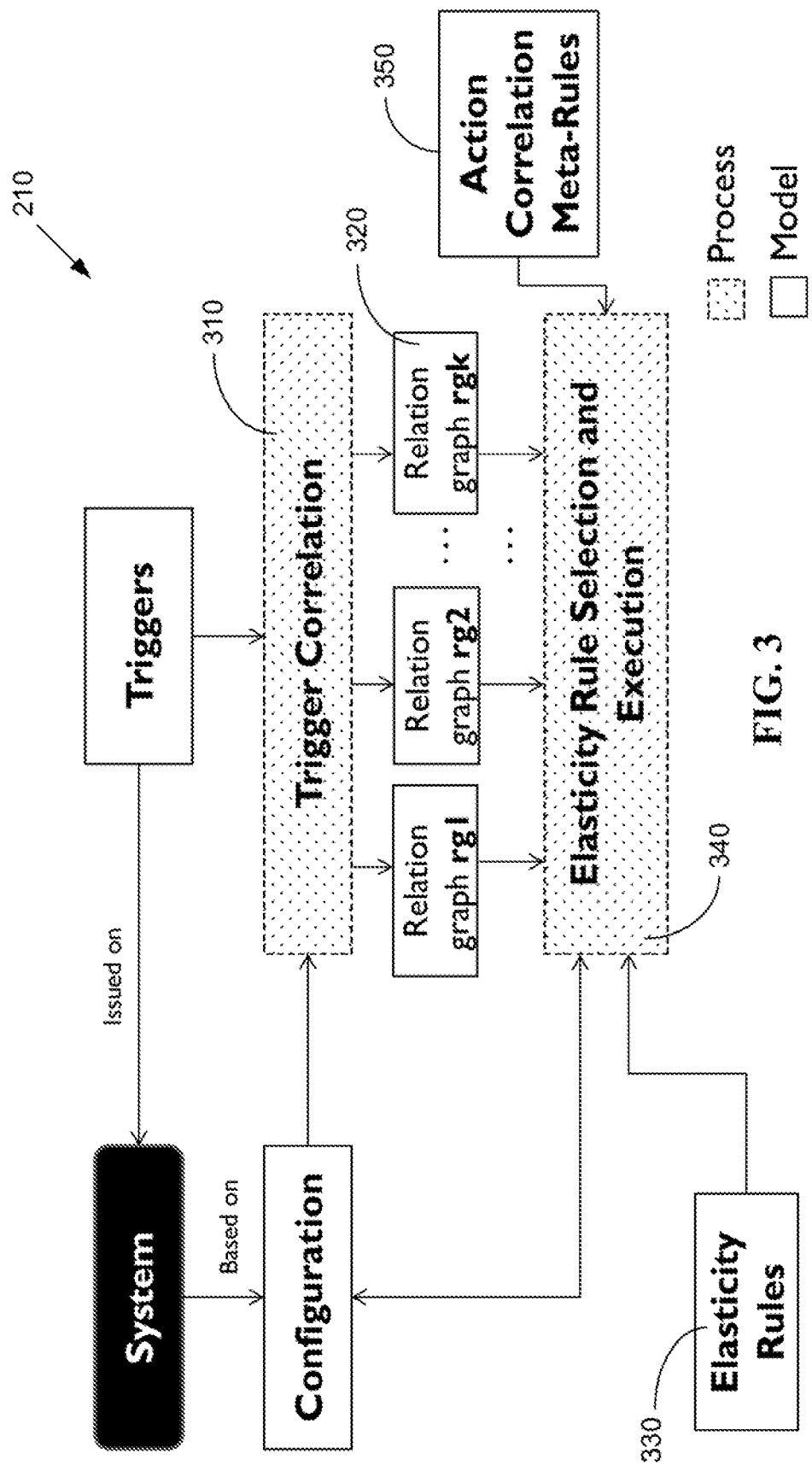
FIG. 3 illustrates a reconfiguration process according to one embodiment.

The overall approach for trigger correlation and system reconfiguration is described as follows. FIG. 3 illustrates the "Reconfiguration and Update of Thresholds" process 210 of FIG. 2 in more details. When multiple triggers are issued within a monitoring period of time, they are first correlated in a trigger correlation process 310. The output of the trigger correlation process 310 is a set of relation graphs 320. The nodes of the relation graphs 320 are the triggers and the edges represent the relations between the triggers. For each trigger, an applicable elasticity rule 330 is selected and executed in process 340. For each graph, the execution of the actions associated with the selected elasticity rules 330 is correlated using a set of meta-rules 350. These meta-rules 350 determine how the actions of the elasticity rules 330 are applied when their corresponding triggers are related. Actions of elasticity rules 330 of unrelated triggers can be executed in parallel.

Figure 4:
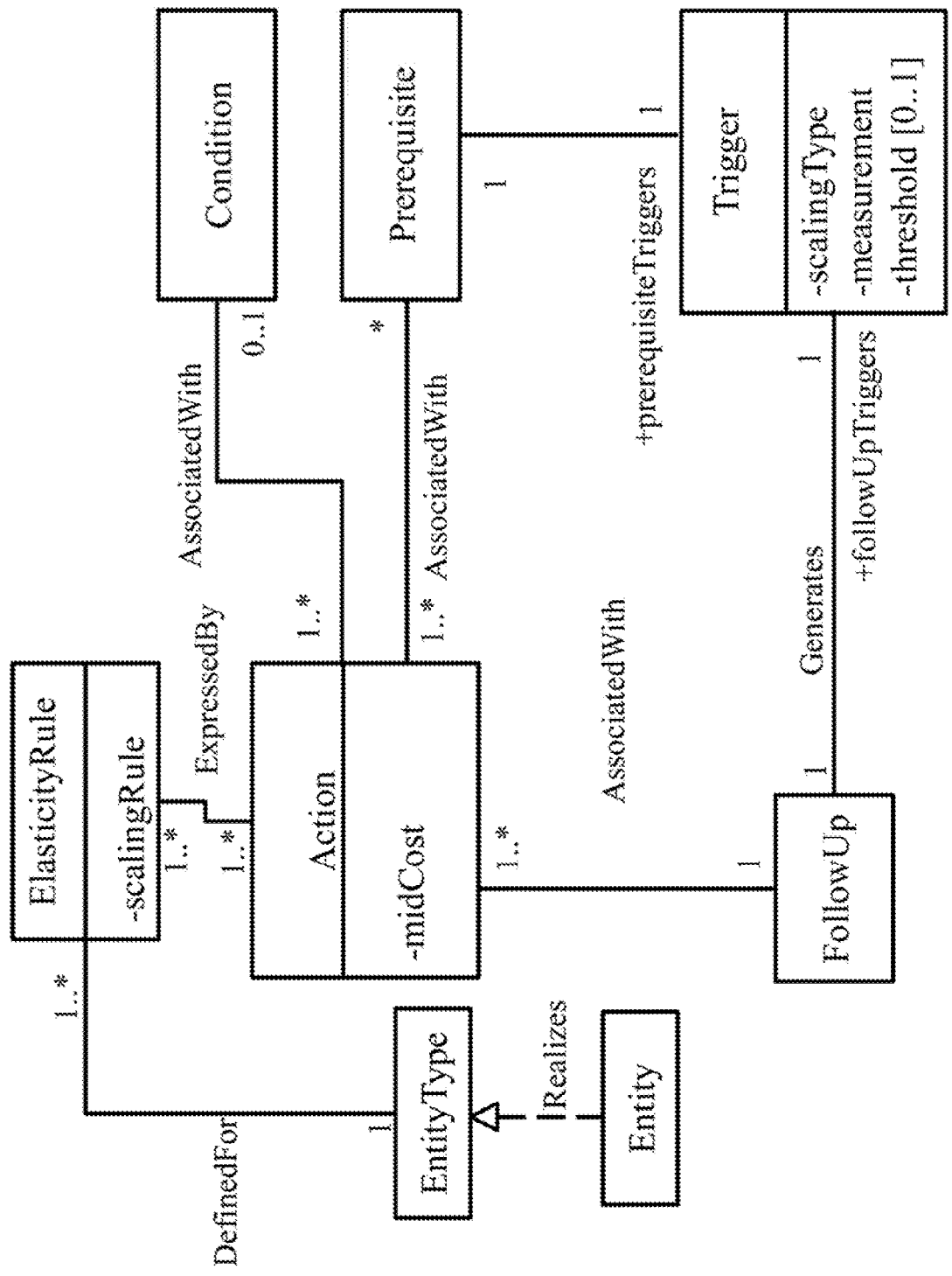
FIG. 4 illustrates a metamodel of elasticity rules according to one embodiment.

FIG. 4 illustrates a metamodel of elasticity rules according to one embodiment. A metamodel is a higher-level model, which is used to define modeling elements or a domain specific language that can be used to create models for the domain. One of the approaches for automating the resource provisioning and de-provisioning of systems at runtime is to take actions according to elasticity rules. Each system entity is of a type. Different instances of a type share the same features. Therefore, an elasticity rule is defined for an entity type with potentially different actions. An action can be associated with a condition and different prerequisites. A condition can be a Boolean expression which can be evaluated to true for the corresponding action to be considered. When the condition is evaluated to false, the corresponding action is not applicable in the current situation and is not considered for execution. To execute an action of an invoked elasticity rule, other elasticity rules may be invoked as prerequisites. Therefore, prerequisites in association with an action are defined. In the case that an entity (i.e. dependent) requires the resources of another entity (i.e. sponsor), it is less likely that the triggers on both entities are generated during the same period of monitoring time (usually the trigger on the dependent is generated before the trigger on the sponsor). The action contained in the dependent elasticity rule has a prerequisite which checks the capacity of the sponsor and if needed, the sponsor is reconfigured as well even if there is no trigger for it. This is a proactive action which allows to avoid, in the near future, other triggers related to the sponsor. An action can be taken if it is both applicable and feasible. If an action is applicable but a prerequisite is not met (the action is not currently feasible), a prerequisite trigger is generated to initiate the execution of the prerequisite elasticity rule and make the action feasible. For illustration purpose, consider an elasticity rule for a resizable VM where one action of the elasticity rule is adding virtual resources to the VM. A resizable computing node such as a resizable VM has a maximum capacity that it can expand to. In this example, the condition (i.e. applicability) is defined as a Boolean expression that checks if the VM has not yet reached its maximum capacity. The associated prerequisite (i.e. feasibility) checks if the hosting physical node has enough resources for the VM. If the VM has reached its maximum capacity (i.e. the condition is not met), resources cannot be allocated to the VM regardless of the prerequisite. In the case that the VM has not yet reached its maximum capacity (the action is applicable) but the physical host does not have enough resources (the prerequisite is not met), a prerequisite trigger on the physical host is generated to execute the physical host elasticity rule first. The action on the physical host can be the addition of physical resources to the host if it is applicable (e.g. hyper scale data center systems) or releasing physical resources by moving out some services or migrating other VMs to other hosts.

After the execution of an action, a trigger may be generated to invoke the elasticity rule for the execution of a follow-up action. In the elasticity rule metamodel, the FollowUp metaclass is a Boolean expression which checks if there is a follow-up action. For instance, after the removal of workload units or assignments, a trigger may be generated to remove unused providers if there are any.

In an elasticity rule, different alternative actions may be specified to reconfigure the system. Depending on the condition and the prerequisite(s) met, an optimal action is chosen and invoked. To choose the optimal action among applicable alternatives, the feasible action with the least cost is selected. The cost is an approximation which is the median of the minimum cost (i.e. when all the prerequisites are met, no prerequisite action is invoked) and the maximum cost (i.e. when none of the prerequisites are met and all prerequisite actions are invoked). In the case that none of the applicable alternatives are feasible, the infeasible action with least cost is selected for invocation by executing required prerequisite(s) first.

The system is initially dimensioned at design time. The predefined equations used to dimension the system as well as some calculated parameters are used to define the actions and the prerequisites of the elasticity rules. These prerequisites and actions as well as the conditions are parametrized. At runtime, the values of these parameters can evolve with the system evolution. The elasticity rules are defined while taking into account the service availability. For example, when software instances (i.e. serving units) are added by executing elasticity rules, the instances are adequate not only to handle the workload increase but also to protect the provided service. For an entity type, two different elasticity rules are defined: one for expansion (the scaling rule is Increase) and one for shrinking of the system (the scaling rule is Decrease).

Figure 5:
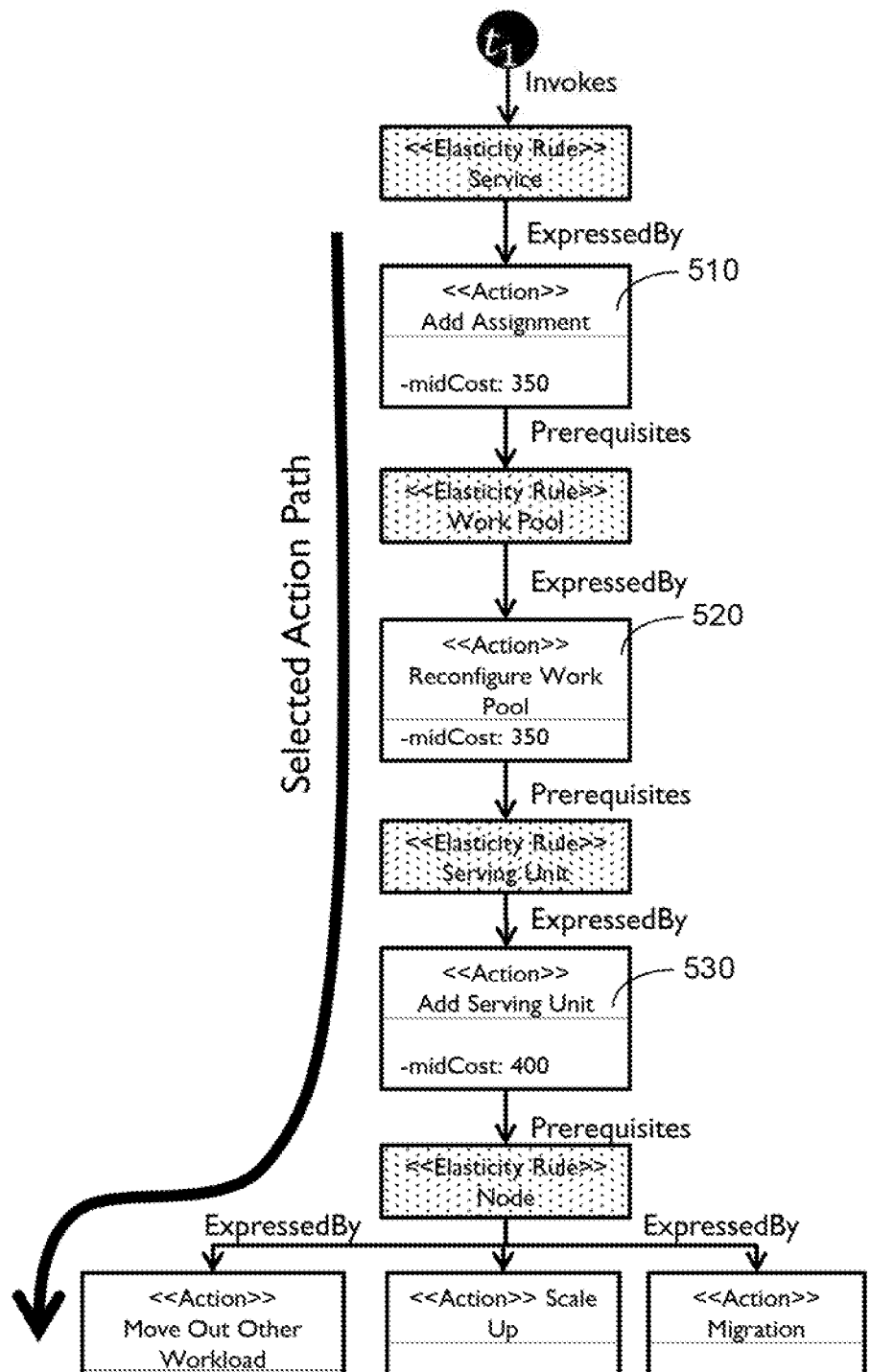
FIG. 5 illustrates an example of a potential action path invoked by a trigger through the invocation of its corresponding elasticity rules according to one embodiment.

FIG. 5 illustrates an example of a potential action path invoked by a trigger through the invocation of its corresponding elasticity rules. Suppose that due to workload increase, trigger (t1) for scaling the system is received from the SLA compliance management framework. Based on the scalingType of the trigger (increase) and the related entity (service), the applicable elasticity rule is selected and invoked. In the selected elasticity rule the defined action is the addition of an assignment at step 510. To add an assignment, the prerequisite is that there is a serving unit in the work pool to which the new assignment can be assigned. If there is no such serving unit in the work pool (i.e. the prerequisite is not met), a prerequisite trigger is generated to initiate another elasticity rule for reconfiguring the work pool at step 520 by adding to it a new serving unit at step 530. A serving unit requires a node to host it. If there is no such node, a prerequisite trigger is generated again to invoke the corresponding elasticity rule. The actions contained in the node elasticity rule include: moving out some workload to other nodes with approximate cost of 500 which is feasible if there are enough providers for them; scaling up with approximate cost of 300, which is applicable if the node has not yet reached the maximum capacity and feasible if the physical node hosting the node has enough resources; and migrating the node with approximate cost of 700 if as prerequisite there is a physical node to host it. Considering the current situation, assume that all of the contained actions are applicable, but only the first and the third actions which are moving out some workload and migration are feasible. In this example, the first action is chosen as the optimal action as all the action's prerequisites are met and most likely it will result in an efficient reconfiguration in terms of cost. In this example, trigger t1 leads to the invocation of multiple elasticity rules where the invocation of one elasticity rule is a prerequisite for another one. The actions contained in the initiated elasticity rules constitute a path where one action in the path is a prerequisite for another. A path resulting from the invocation of an elasticity rule is called an action path. By executing an action path, the configuration changes to a new configuration.

Since triggers may lead to reconfiguration actions through the invocation of elasticity rules, when two configuration entities are related the actions to be applied may also be related and need to be coordinated. Therefore, the triggers raised at the same time are put into relation before their respective invoked actions are correlated. To correlate triggers, the relations between the configuration entities to which the triggers are related are taken into account.

Figure 6:
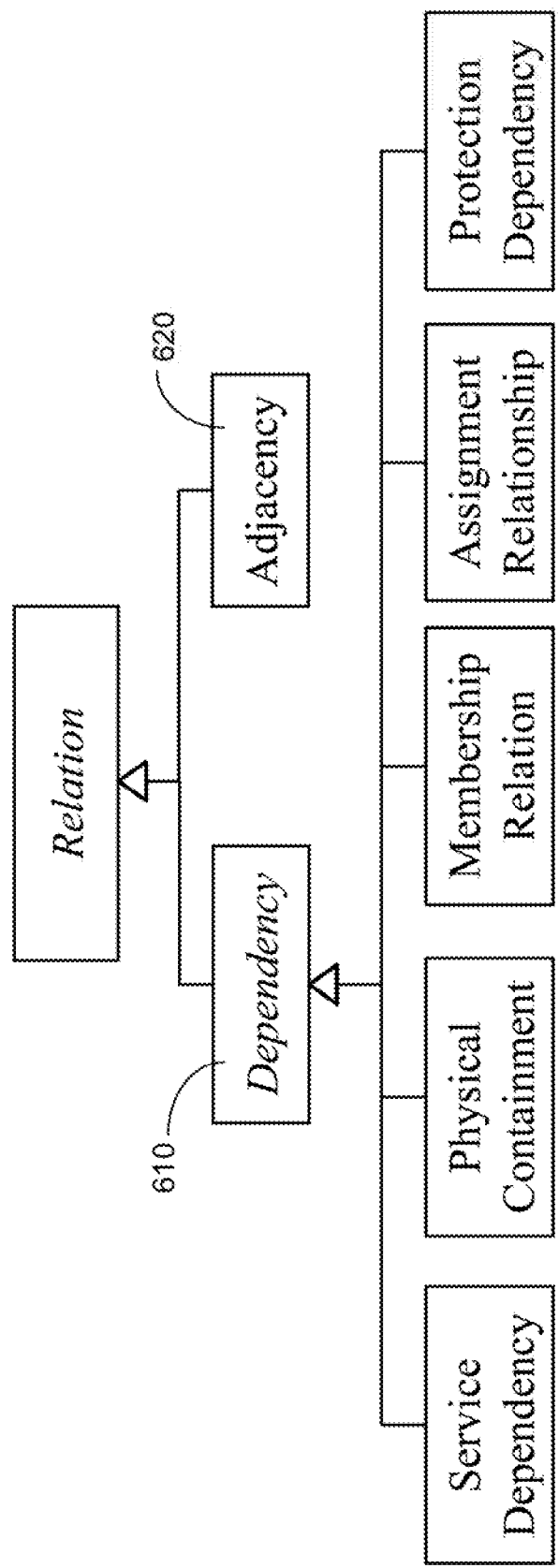
FIG. 6 illustrates different types of relations between entities according to one embodiment.

FIG. 6 illustrates different types of relations between configuration entities according to one embodiment. The relations can be of different types and categorized into two categories, dependency relations 610 and adjacency relation 620. The dependency relations 610 consists of directed relations and the adjacency relation 620 defines a symmetric relation. The different types of relations are defined as follows. Service Dependency: This relation exists between services when one service to be provided (i.e. dependent entity) requires another service (i.e. sponsor entity); therefore, the sponsor needs to be provided first to support the dependent. Protection Dependency: This relation is defined between the active and the standby assignments of a workload unit. Assignment Relationship: This relation is defined between a serving unit (i.e. service provider entity) and the workload unit (i.e. service entity) assigned to it. Membership Relation: A membership relation exists between two entities when an entity is logically a member of a group represented by the other entity. For example, a node is a member of a node group. Physical Containment: A physical containment relation exists between two entities if one entity is physically part of the other entity. In this case, the container entity (i.e. sponsor) provides resources for the contained entity (i.e. dependent). For example, a physical node is a container entity which provides resources for its hosted VMs as contained entities. Adjacency relation 620 is defined as: two entities are adjacent when they are depending on the same sponsor. In this case, the common sponsor is called the common entity.

Figure 7:
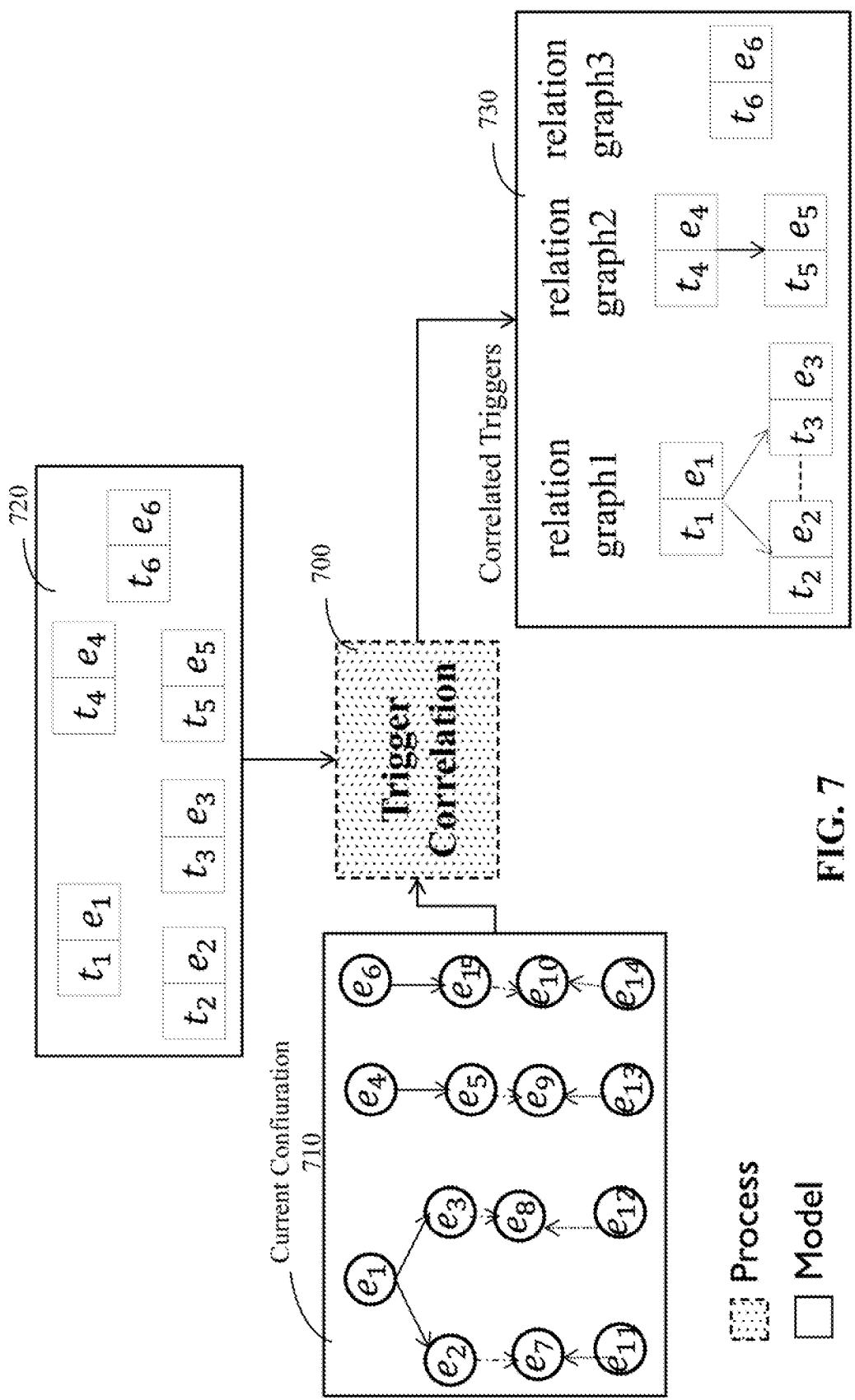
FIG. 7 illustrates an example of a trigger correlation process according to one embodiment.

FIG. 7 illustrates an example of a trigger correlation process 700 according to one embodiment. Trigger correlation is defined as a procedure of putting two or more triggers into relation, if any, to handle them together. A trigger is generated when a constraint is violated in the SLA compliance model. For an entity, different thresholds (e.g. capacity, service availability, response time, etc.) and therefore, different constraints have been defined. For example, the threshold for node capacity is a vector of different types of node resources (e.g. CPU, memory, etc.). Each constraint is named after the action it triggers when it is violated. For example, the constraint which checks for a workload unit if the serving unit capacity threshold has been reached is named Increase and if violated, a scaling trigger is generated to increase the capacity.

A trigger for scaling the system is a tuple composed of the elements: entity, scalingType, measurement and threshold. The entity in the tuple identifies the entity on which the trigger has been issued. The scalingType specifies whether an action to increase or decrease the resources is needed. The elements measurement and threshold represent the measurements from the monitoring system 200 (FIG. 2) and the current threshold values that have been violated. The values of threshold and measurement can be used to determine the amount of resource to be given to or released from the entity to resolve the violation of the received trigger.

In the example of FIG. 7, six triggers (t1-t6) are issued. These triggers may be issued by the monitoring system during a measurement period. To correlate triggers raised at the same time, the entities on which the triggers have been issued are looked up in a current configuration 710. Each trigger is issued on an entity. As shown in block 720, six entities (e1-e6) are the entities on which the triggers are issued. Any relations between these entities according to the current configuration 710 are transferred to their associated triggers. As shown in the example of FIG. 7, the output of the trigger correlation process 700 is a set of graphs 730 in which the nodes of the graphs are the triggers and edges are the relations among the triggers. Since the generated graphs capture the relations between the triggers, they are called relation graphs.

The following description explains the selection of elasticity rules given the correlated triggers. When triggers are generated, the applicable elasticity rules are selected. The scalingType of a generated trigger is either Increase to initiate resource allocation when a maximum threshold is violated or Decrease to initiate the release of resources when a minimum threshold is reached. A trigger is issued on a configuration entity when any of its current threshold values is reached. Each configuration entity is an instance of a given type. On the other hand, an elasticity rule specifies the actions that can be taken on an instance of a given type to resolve a given type of threshold violation. The scalingRule defined in the elasticity rules is Increase if the actions add resources, or Decrease if the actions remove resources from the instance of the given type. As a result, an elasticity rule is selected for invocation if the scalingRule of the elasticity rule is equal to the scalingType of the received trigger and also the entityType of the elasticity rule is the same as the type of the entity for which the trigger was generated.

In the following, a set of meta-rules are introduced. A meta-rule is a higher level rule that governs the application of other rules by indicating how to apply them. A set of meta-rules are defined to order the triggers and to correlate the actions of the elasticity rules selected to resolve these triggers. These meta-rules are called action correlation meta-rules, and their applicability is governed by the relations between the triggers. In one embodiment, the action correlation meta-rules may be implemented as Atlas Transformation Language (ATL) rules.

The Meta-Rule for Dependency Relation: To execute an action on a dependent entity, at first the capacity of its sponsor is checked as a prerequisite, which also means that a trigger on a sponsor entity can be because of its dependent(s). If the prerequisite is not met, then a prerequisite action is taken to provide a sponsor first, which therefore may resolve the sponsor's trigger. To illustrate, assume that the workload for a service whose load can be shared between nodes (i.e. there is more than one active assignment representing the workload and the redundancy model is n-way-active) increases and two triggers are generated: One for the service (dependent) and one for the node supporting that service (sponsor). In this example, the least costly action of the elasticity rule invoked by the dependent trigger is executed first, which is adding an assignment on another node (i.e. the system is scaled out). Once the action path of dependent entity is executed, the workload is shared between two nodes and therefore less workload will be imposed on the original sponsor node for which the sponsor trigger was received. It may not be applicable anymore and to determine that the sponsor trigger needs to be updated. Accordingly, Meta-Rule 1 is defined as follows which handles horizontal scaling (i.e. scaling out).

Meta-Rule 1: If the relation between triggers is of type physical containment or assignment relationship and the least costly action for resolving the dependent trigger is scale-out, the action path for the dependent entity is executed before the path for the sponsor entity.

Meta-Rule 1 handles the cases where the relation between the triggers is of type physical containment or assignment relationship and the execution of dependent action path provides solution for the sponsor through adding a new sponsor (i.e. scaling out). Note that adding an assignment may not be the least costly action or may not an option at all.

Meta-Rule 2: If multiple triggers have physical containment relations with the same container trigger and the least costly action for resolving each contained trigger is scale-up, the corresponding entities of the contained triggers are sorted in ascending order using the metric $m_i$=(migrationCost$_i$/releasedResource$_i$), where migrationCost is the approximate cost of migrating the entity to another container and releasedResource is the amount of resources released by the migration. The contained entities with smaller $m_i$ are migrated until the container trigger is resolved.

Unlike Meta-Rule 1, Meta-Rule 2 handles vertical scaling. According to Meta-Rule 2, if multiple contained entities (i.e. dependents such as VMs) depending on the same container (i.e. sponsor such as a physical host) need to be scaled up but the container does not have enough resources for all of them, one or more contained entities (i.e. dependents) whose migration release more resources with less cost are migrated to other containers first to release resources of the container. The released resources of the sponsor can be given to the remaining dependent entities to scale up.

If the relation between triggers is of type dependency, but neither Meta-Rule 1 nor Meta-Rule 2 can be applied, another meta-rule is needed to ensure that the action paths of dependent and sponsor are not executed simultaneously. For that purpose, the third meta-rule is defined as follows.

Meta-Rule 3: If the relation between triggers is of type dependency but none of Meta-Rule 1 and Meta-Rule 2 can be applied, the action path for the sponsor entity is executed before the path for the dependent entity.

Meta-Rules for adjacency relation: When triggers invoke elasticity rules on adjacent entities, it is possible that the actions in the elasticity rules try to manipulate their common entity (i.e. their container or sponsor) simultaneously. In this case, a conflict may occur. To prevent such conflicts, one action at a time is taken on the common entity. The order of actions on the common entity affects the efficiency of reconfiguration. To optimize it, the following meta-rules are defined.

Meta-Rule 4: The actions releasing resources of the common entities are taken first.

Meta-Rule 5: Any action for removing a common resource/entity (e.g. removing a node) is considered only after executing all the action paths of all adjacent triggers, at which point the action is taken if it is still applicable.

When executing the action paths, triggers which release common resources are given higher priority than triggers which allocate resources to enable reallocation. To facilitate this reallocation at the common entity level the resource removal actions of the common entity are delayed until all the adjacent triggers have been considered. Thus, the resources of the common entity are released at the end only if they have not been allocated by corresponding actions of other adjacent triggers. When all the member entities of a common entity can be removed, the common entity is removed as well (e.g. a work pool is removed when all its member serving units can be removed or when a common entity such as node has no process to run).

FIGS. 8A-8D illustrate an example for trigger correlation and reconfiguration. Referring again to the example shown in FIG. 1, suppose that at some point in time, the configuration is shown as in FIG. 8A and two triggers (t1 and t2) are generated by the SLA compliance management framework for Workload Unit1 and Workload Unit2, respectively. Assume that Trigger t1 is generated due to a decrease in the workload represented by Workload Unit1 to the point that causes two assignments to be removed, and Trigger t2 is generated due to an increase of the workload represented by Workload Unit2.

Figure 8A:
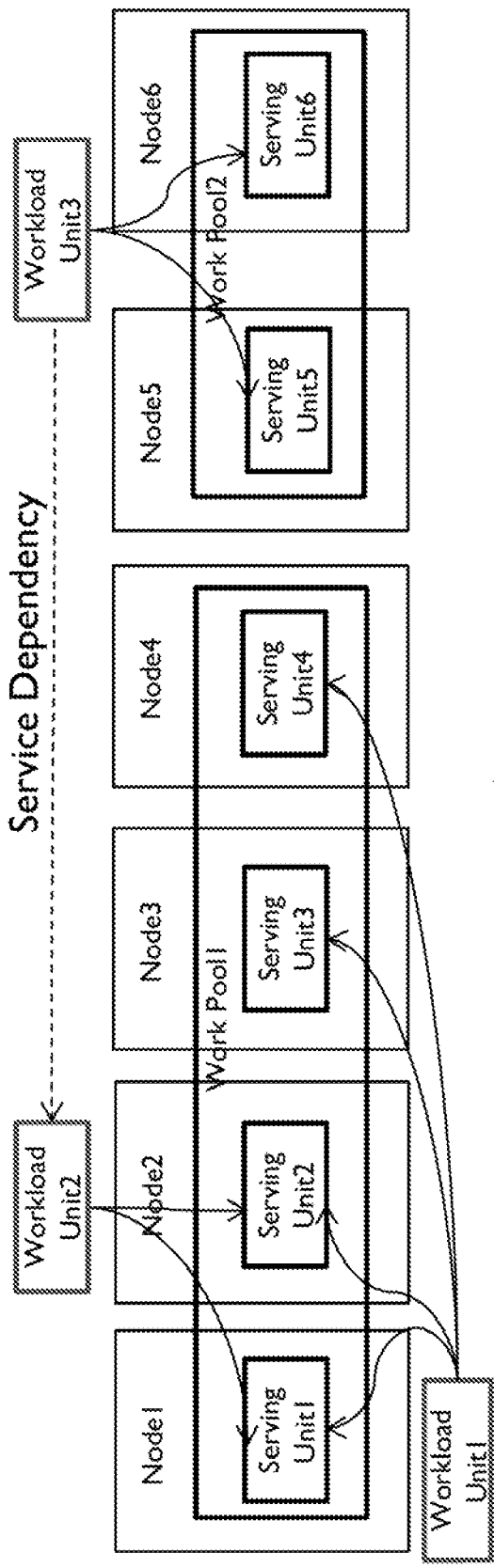
FIGS. 8A-8D illustrate an example for trigger correlation and reconfiguration according to one embodiment.
Figure 8B:
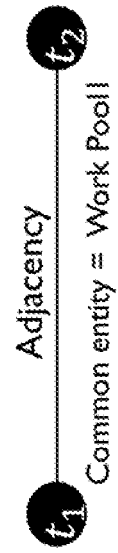

To reconfigure the system, at first the triggers issued on related entities are put into relation. Workload Unit1 and Workload Unit2 are protected by the same work pool (having the same logical container). Therefore, their corresponding triggers are put into the adjacency relation. In this relation, the common entity is Work Pool1. FIG. 8B shows the relation graph resulted from the trigger correlation process.

Figure 8C:
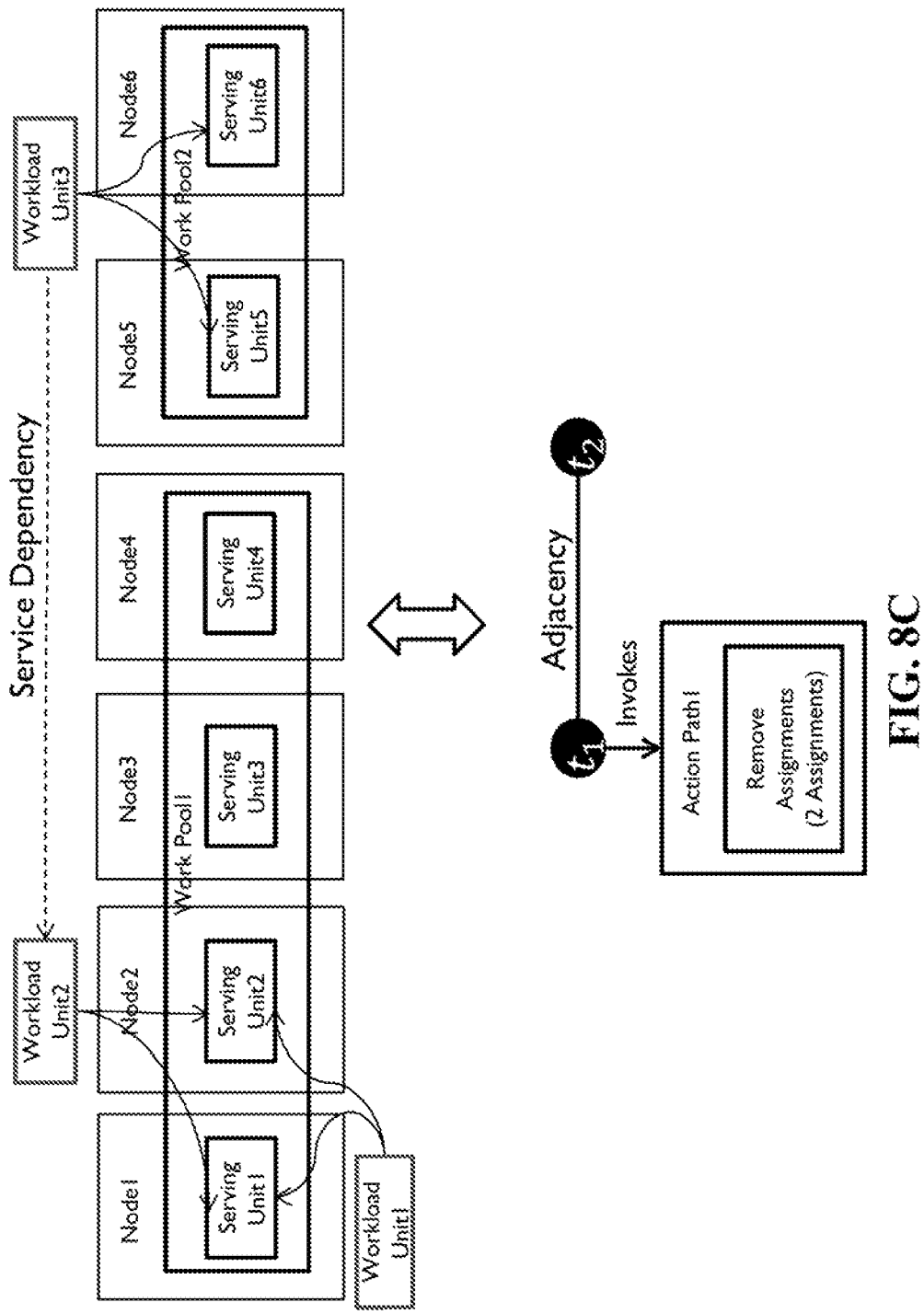

Next, the applicable elasticity rules are selected and based on the defined action correlation meta-rules, the triggers of the relation graph are ordered for invoking the applicable elasticity rules. Based on Meta-Rule 4 for the adjacency relation, the action path resulting from the invocation of the elasticity rule by t1 is executed before the action path resulting from the invocation of the elasticity rule by t2 because the scalingType of trigger t1 is Decrease. Therefore, trigger t1 is considered first to execute its corresponding elasticity rule. FIG. 8C shows the configuration resulted from the execution of Action Path1. According to the elasticity rule for Workload Unit1, two assignments should be removed to reconfigure the system. By the removal of assignments, serving units hosted on Node3 and Node4 become unassigned (without assignments). Considering Meta-Rule 5, the resource removal action on Work Pool1 as common entity is delayed till the adjacent trigger t2 manipulates the common entity.

According to the elasticity rule initiated by trigger t2, one assignment is added to handle the workload increase represented by Workload Unit3. There are two prerequisites for this action: first, there exists a serving unit to which the added assignment can be assigned; and secondly, its sponsor has enough capacity to support the increase. The first prerequisite can be met by Serving Unit3 or Serving Unit4. Since according to the service dependency each assignment of Workload Unit2 needs one assignment of Workload Unit3, the increase in the workload represented by Workload Unit2 cannot be sponsored by the current number of Workload Unit3's assignments. Therefore, the second prerequisite is not met by the current configuration. To make the action feasible, a prerequisite trigger on Workload Unit3 is generated to increase the sponsor's capacity. The generated prerequisite trigger invokes the elasticity rule for Workload Unit3. According to Workload Unit3's elasticity rule, one assignment of Workload Unit3 should be added to resolve the prerequisite trigger; however, the action cannot be taken until Work Pool2 is reconfigured in a way that the added assignment can be assigned. Therefore as a prerequisite, the required serving unit is added to Work Pool2 first. To add a serving unit, there needs to be a node to provide the required resources for the added serving unit. Although Node4 has enough resources, it cannot host the serving units of Work Pool2 because Node4 is not a member of Node Group2 on which Work Pool2 can be configured. Since this perquisite is not met, a node is added so that the serving unit can be added to Work Pool2. Note that node groups are shown in FIG. 1 only and not in FIGS. 8A-8D.

Figure 8D:
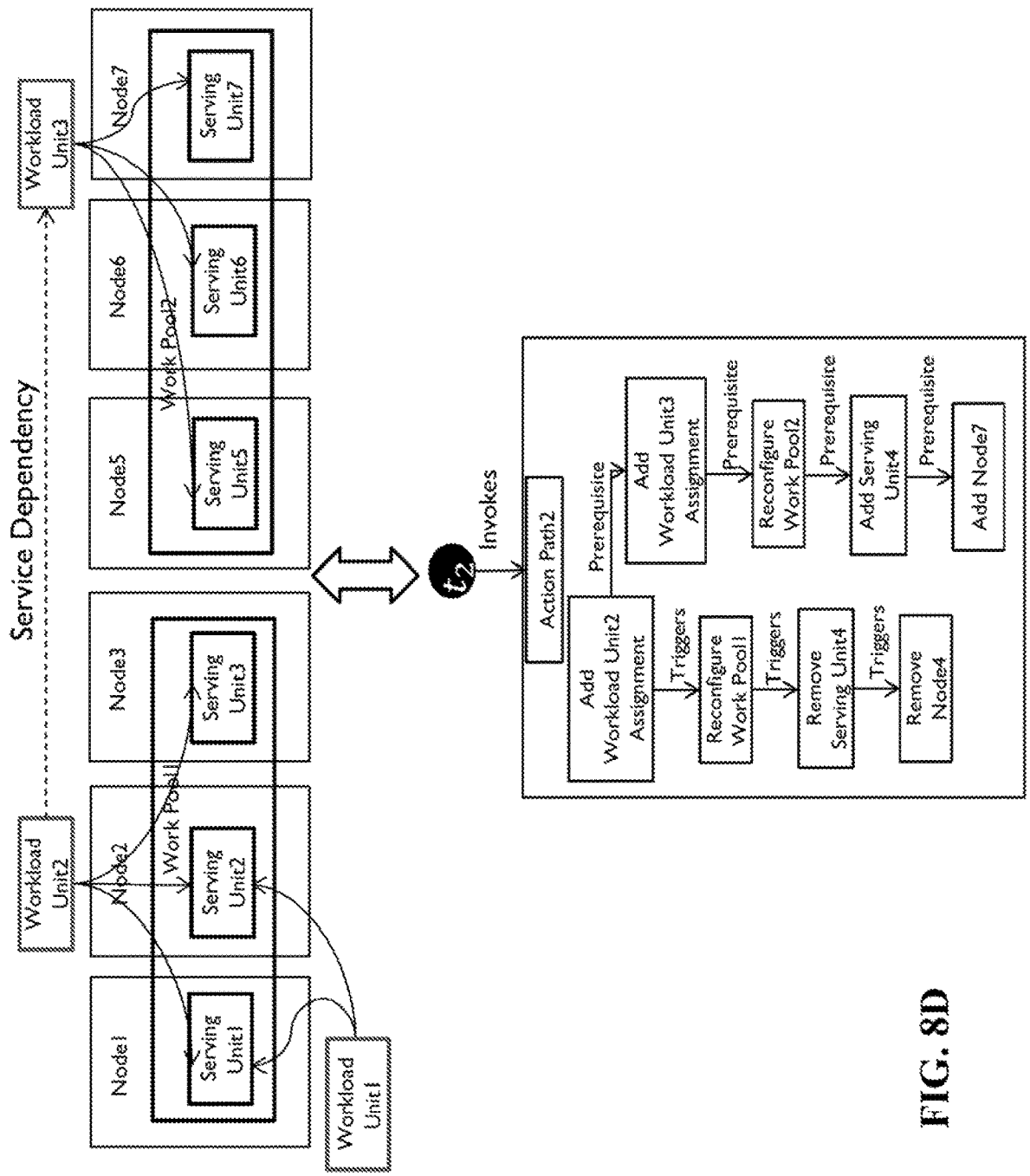

Once all adjacent triggers (i.e. t1 and t2) with the same common entity have been processed, the delayed resource removal action on Work Pool1 can be evaluated and therefore the serving unit hosted on Node4 is removed from Work Pool1. Node4 does not have any running serving units. Therefore, the resource removal action can be taken at this moment. FIG. 8D shows the configuration resulting from the execution of Action Path2.

The model based approach for trigger correlation is part of an overall framework for SLA compliance management and dynamic reconfiguration. It aims at proactive configuration of related entities, avoiding resource oscillation and improves resource utilization. To reduce overhead and speed up the reconfiguration, each action is executed as soon as it is selected among the alternatives. To choose an action among the alternatives, the cost of actions is considered. The cost of actions is an approximation and it includes the approximate cost of prerequisites as well.

Figure 9:
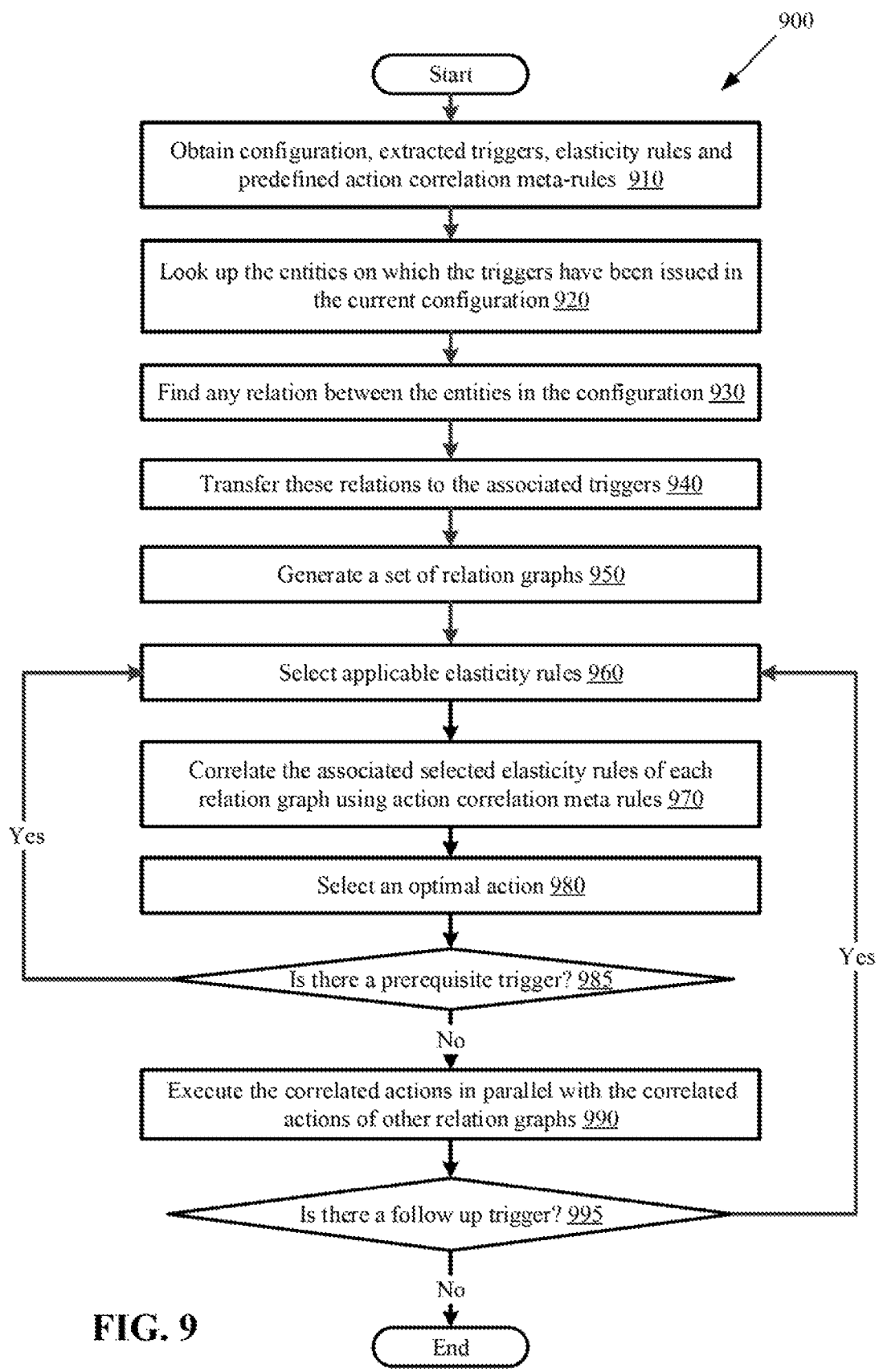
FIG. 9 is a flow diagram illustrating a method for correlating triggers for dynamic system reconfiguration according to one embodiment.

FIG. 9 is a flow diagram illustrating a method 900 for correlating triggers for dynamic system reconfiguration according to one embodiment. The method 900 may be performed by a management system, which is coupled to a monitoring system 200 (FIG. 2), for dynamically reconfiguring a service-providing system. The method 900 begins at step 910 where the system obtains a configuration, extracted triggers, elasticity rules and predefined action correlation meta-rules as input. The triggers may be generated by the monitoring system 200. At step 920, the system looks up the entities on which the triggers have been issued in the current configuration. The system at step 930 finds any relation between the entities in the configuration, and at step 940 transfer these relations to the associated triggers to generate a set of relation graphs at step 950. The system selects applicable elasticity rules at step 960, and correlates the associated selected elasticity rules of each relation graph using action correlation meta-rules at step 970. The system at step 980 selects an optimal action (e.g. an action with the least estimated cost). If there is a prerequisite associated with the selected action at step 985, the system generates a prerequisite trigger and repeats steps 960, 970 and 980 for the prerequisite trigger. The loop of steps 960-985 continues until there is no prerequisite trigger associated with any of the selected actions. The system then executes the correlated actions according to the ordering imposed by the action correlation meta-rules, in parallel with the correlated actions of other relation graphs at step 990. If at any point of the loop the optimal action selected in step 980 does not resolve in an applicable elasticity rule in step 960, a less optimal action is selected in 980 as described above in connection with FIG. 4. After executing the correlated actions, if there is a follow-up associated with an executed action at step 995, the system generates a follow-up trigger and repeats steps 960, 970, 980, 985 and 990 for the follow-up trigger. The loop of steps 960-995 continues until there is no follow-up trigger associated with any of the executed actions. The method 900 then terminates.

Figure 10:
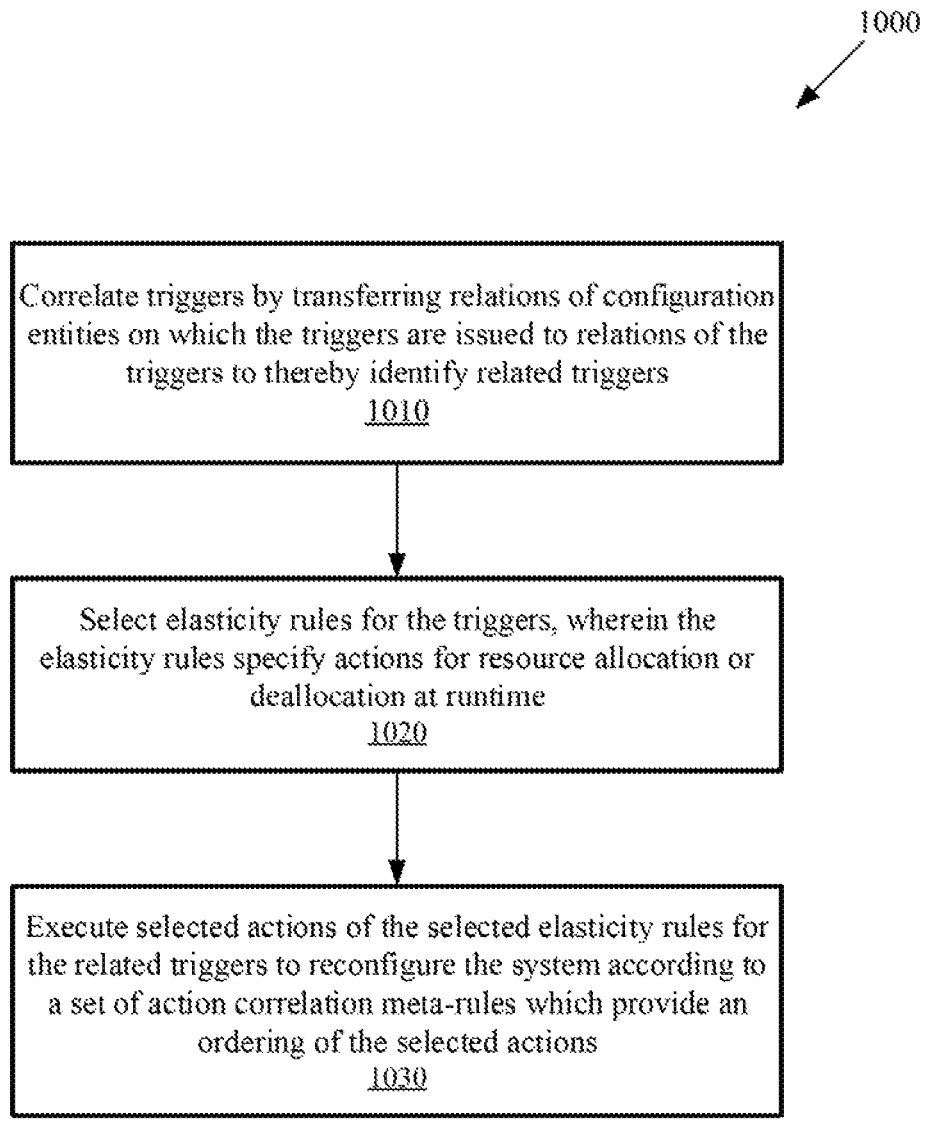
FIG. 10 is another flow diagram illustrating a method for correlating triggers for dynamic system reconfiguration according to one embodiment.

FIG. 10 is a flow diagram illustrating a method 1000 for reconfiguring a system at runtime when triggers are issued in response to events taking place in the system according to one embodiment. The method 1000 begins at step 1010 when the triggers issued on configuration entities are correlated to thereby identify related triggers; the triggers may be correlated by transferring relations of the configuration entities to relations of the triggers to thereby identify the related triggers. At step 1020, elasticity rules are selected for the triggers, where the elasticity rules specify actions for resource allocation or deallocation at runtime. At step 1030, selected actions of the selected elasticity rules for the related triggers are executed to reconfigure the system according to a set of action correlation meta-rules which provide an ordering of the actions.

Figure 11:
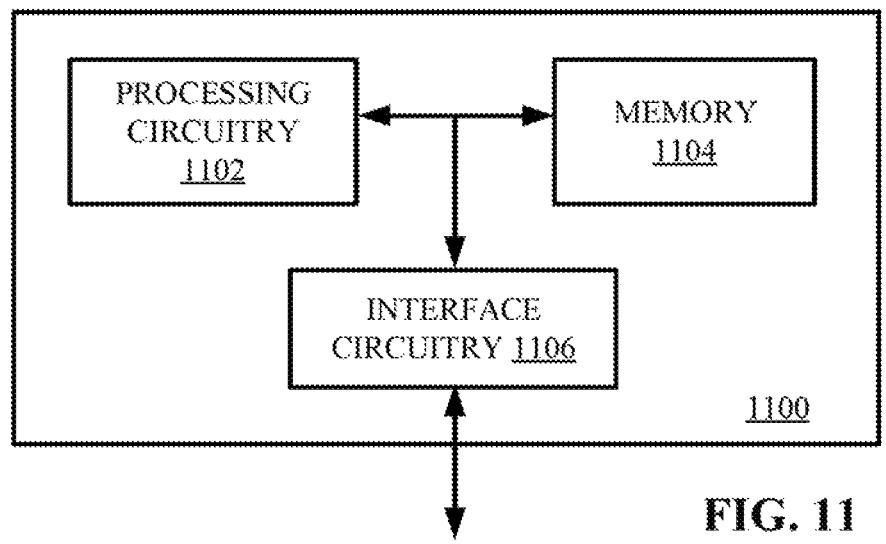
FIG. 11 is a block diagram of a network node according to one embodiment.

FIG. 11 is a block diagram illustrating a network node 1100 according to an embodiment. In one embodiment, the network node 1100 may be a server in an operator network or in a data center. In one embodiment, the network node 1100 may be a management system coupled to a service-providing system (e.g. the system 100 of FIG. 1) and a monitoring system (e.g. the monitoring system 200 of FIG. 2). The network node 1100 includes circuitry which further includes processing circuitry 1102, a memory 1104 or instruction repository and interface circuitry 1106. The interface circuitry 1106 can include at least one input port and at least one output port. The memory 1104 contains instructions executable by the processing circuitry 1102 whereby the network node 1100 is operable to perform the various embodiments described herein.

Figure 12:
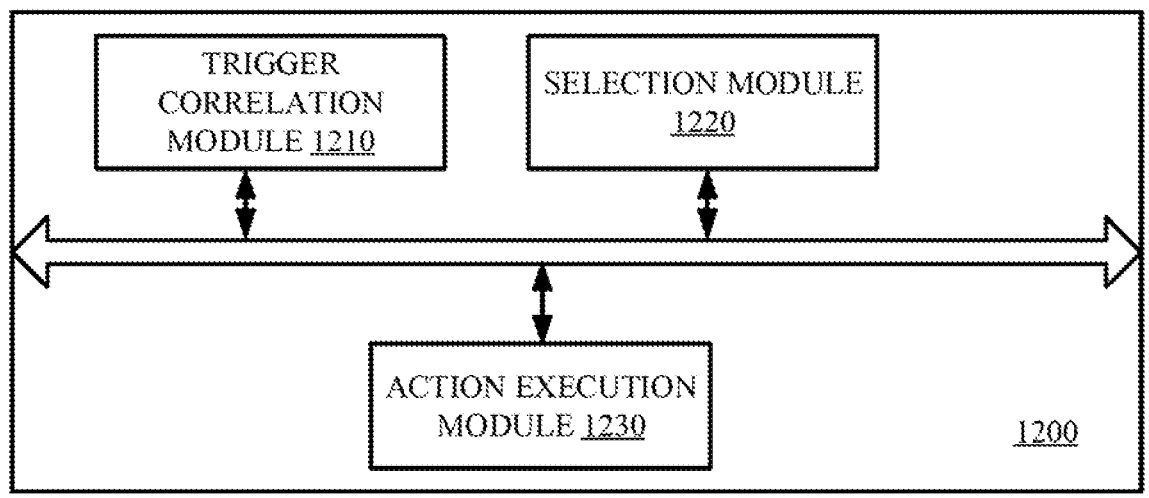
FIG. 12 is a block diagram of a network node according to another embodiment.

FIG. 12 is a block diagram of an example network node 1200 for reconfiguring a system (e.g. the system 100 of FIG. 1) at runtime when triggers are issued (e.g. by the monitoring system 200 of FIG. 2) in response to events taking place in the system according to one embodiment. In one embodiment, the network node 1200 may be a server in an operator network or in a data center. The network node 1200 includes a trigger correlation module 1210 operative or adapted to correlate the triggers by transferring relations of configuration entities on which the triggers are issued to relations of the triggers to thereby identify related triggers; a selection module 1220 adapted to select elasticity rules for the triggers, wherein the elasticity rules specify actions for resource allocation or deallocation at runtime; and an action execution module 1230 adapted to execute selected actions of the selected elasticity rules for the related triggers to reconfigure the system according to a set of action correlation meta-rules which provide an ordering of the actions. The network node 1200 can be configured to perform the various embodiments as have been described herein.

Figure 13:
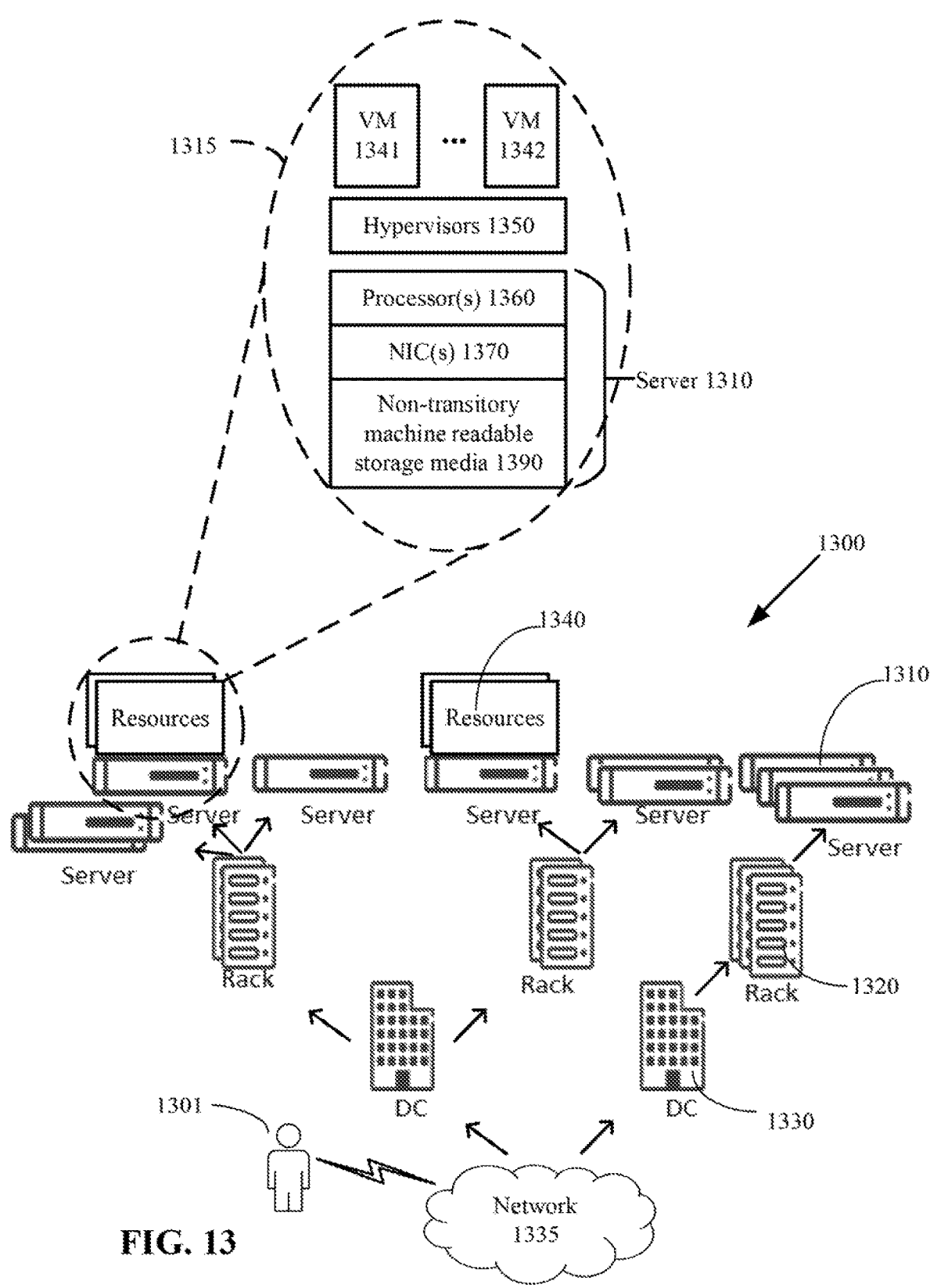
FIG. 13 is an architectural overview of a cloud computing environment according to one embodiment.

FIG. 13 is an architectural overview of a cloud computing environment 1300 that comprises a hierarchy of a cloud computing entities. The cloud computing environment 1300 can include a number of different data centers (DCs) 1330 at different geographic sites connected over a network 1335. Each data center 1330 site comprises a number of racks 1320, each rack 1320 comprises a number of servers 1310. It is understood that in alternative embodiments a cloud computing environment may include any number of data centers, racks and servers. A set of the servers 1310 may be selected to host resources 1340. In one embodiment, the servers 1310 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 1310, the VMs, and the containers within the VMs may be configured to perform the various embodiments as have been described herein.

Further details of the server 1310 and its resources 1340 are shown within a dotted circle 1315 of FIG. 13, according to one embodiment. The cloud computing environment 1300 comprises a general-purpose network device (e.g. server 1310), which includes hardware comprising a set of one or more processor(s) 1360, which can be commercial off-the-shelf (COTS) processors, dedicated Application Specific Integrated Circuits (ASICs), or any other type of processing circuit including digital or analog hardware components or special purpose processors, and network interface controller(s) 1370 (NICs), also known as network interface cards, as well as non-transitory machine readable storage media 1390 having stored therein software and/or instructions executable by the processor(s) 1360.

During operation, the processor(s) 1360 execute the software to instantiate a hypervisor 1350 and one or more VMs 1341, 1342 that are run by the hypervisor 1350. The hypervisor 1350 and VMs 1341, 1342 are virtual resources, which may run node instances in this embodiment. In one embodiment, the node instance may be implemented on one or more of the VMs 1341, 1342 that run on the hypervisor 1350 to perform the various embodiments as have been described herein. In one embodiment, the node instance may be instantiated as a network node performing the various embodiments as described herein.

In an embodiment, the node instance instantiation can be initiated by a user 1301 or by a machine in different manners. For example, the user 1301 can input a command, e.g., by clicking a button, through a user interface to initiate the instantiation of the node instance. The user 1301 can alternatively type a command on a command line or on another similar interface. The user 1301 can otherwise provide instructions through a user interface or by email, messaging or phone to a network or cloud administrator, to initiate the instantiation of the node instance.

Embodiments may be represented as a software product stored in a machine-readable medium (such as the non-transitory machine readable storage media 1390, also referred to as a computer-readable medium, a processor-readable medium, or a computer usable medium having a computer readable program code embodied therein). The non-transitory machine-readable medium 1390 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for reconfiguring a system at runtime when triggers are issued in response to events taking place in the system, comprising:
   correlating the triggers by transferring relations of configuration entities on which the triggers are issued to relations of the triggers to thereby identify related triggers;
   selecting elasticity rules for the triggers, wherein the elasticity rules specify actions for resource allocation or deallocation at runtime; and
   executing selected actions of the selected elasticity rules for the related triggers to reconfigure the system according to a set of action correlation meta-rules which provide an ordering of the actions.

2. The method of claim 1, wherein correlating the triggers further comprises:
   identifying, for each trigger, a corresponding configuration entity on which the trigger is issued; and identifying the relations of the corresponding configuration entity to other configuration entities on which the triggers are issued in a current configuration of the system.

3. The method of claim 1, wherein correlating the triggers further comprises:
correlating the triggers according to the triggers issued in a measurement period during which workload on the configuration entities is measured.

4. The method of claim 1, wherein the action correlation meta-rules define an ordering of the actions based on the relations of the related triggers.

5. The method of claim 1, wherein selecting the elasticity rules further comprises:
for each trigger, selecting an applicable elasticity rule based on, at least in part, an entity type of a configuration entity on which the trigger is issued and a scaling type of the trigger.

6. The method of claim 5, wherein, subsequent to selecting the applicable elasticity rule, the method further comprising:
for each trigger, selecting a feasible action of the applicable elasticity rule based on, at least in part, a cost estimate of the feasible action if the applicable elasticity rule specifies one or more feasible actions; and
for each trigger, selecting a non-feasible action with a lowest cost if the applicable elasticity rule specifies no feasible actions, and wherein feasibility of an action is determined by whether or not any prerequisite associated with the action is unmet.

7. The method of claim 1, wherein the relations of the triggers include one or more of a dependency relation and an adjacency relation, wherein the dependency relation further includes one or more of: service dependency, protection dependency, assignment dependency, membership dependency, and physical containment, and the adjacency relation indicates whether two configuration entities depend on a common entity.

8. The method of claim 1, wherein correlating the triggers further comprising:
generating a set of relation graphs in which nodes represent the triggers and edges represent the relations of the triggers.

9. The method of claim 1, further comprising:
generating a prerequisite trigger for an unmet prerequisite of a selected action associated with a given trigger, wherein the prerequisite trigger invokes a first elasticity rule and the given trigger invokes a second elasticity rule; and
executing a first action specified by the first elasticity rule before a second action specified by the second elasticity rule.

10. The method of claim 1, further comprising:
generating a follow-up trigger indicating that a selected action associated with a given trigger requires a follow-up action, wherein the given trigger invokes a first elasticity rule and the follow-up trigger invokes a second elasticity rule; and
executing a first action specified by the first elasticity rule before a second action specified by the second elasticity rule.

11. The method of claim 1, wherein selecting the elasticity rules further comprises:
selecting a plurality of elasticity rules for a plurality of triggers including the triggers issued in response to the events, prerequisite triggers and follow-up triggers, wherein each prerequisite trigger is generated for an unmet prerequisite of one of the selected actions, and each follow-up trigger is generated for a follow-up action of one of the selected actions.

12. A network node comprising:
processing circuitry; and
memory containing instructions executable by the processing circuitry to reconfigure a system at runtime when triggers are issued in response to events taking place in the system; the network node operative to:
correlate the triggers by transferring relations of configuration entities on which the triggers are issued to relations of the triggers to thereby identify related triggers;
select elasticity rules for the triggers, wherein the elasticity rules specify actions for resource allocation or deallocation at runtime; and
execute selected actions of the selected elasticity rules for the related triggers to reconfigure the system according to a set of action correlation meta-rules which provide an ordering of the actions.

13. The network node of claim 12, wherein the network node is further operative to: identify, for each trigger, a corresponding configuration entity on which the trigger is issued; and
identify the relations of the corresponding configuration entity with other configuration entities on which the triggers are issued in a current configuration of the system.

14. The network node of claim 12, wherein the network node is further operative to:
correlate the triggers according to the triggers issued in a measurement period during which workload on the configuration entities is measured.

15. The network node of claim 12, wherein the action correlation meta-rules define an ordering of the actions based on the relations of the related triggers.

16. The network node of claim 12, wherein the network node is further operative to:
for each trigger, selecting an applicable elasticity rule based on, at least in part, an entity type of a configuration entity on which the trigger is issued and a scaling type of the trigger.

17. The network node of claim 16, wherein, subsequent to selecting the applicable elasticity rule, the network node is further operative to:
for each trigger, select a feasible action of the applicable elasticity rule based on, at least in part, a cost estimate of the feasible action if the applicable elasticity rule specifies one or more feasible actions; and
for each trigger, select a non-feasible action with a lowest cost if the applicable elasticity rule specifies no feasible actions, and wherein feasibility of an action is determined by whether or not any prerequisite associated with the action is unmet.

18. The network node of claim 12, wherein the relations of the triggers include one or more of a dependency relation and an adjacency relation, wherein the dependency relation further includes one or more of: service dependency, protection dependency, assignment dependency, membership dependency, and physical containment, and the adjacency relation indicates whether two configuration entities depend on a common entity.

19. The network node of claim 12, wherein the network node is further operative to:
generate a set of relation graphs in which nodes represent the triggers and edges represent the relations of the triggers.

20. The network node of claim 12, wherein the network node is further operative to:
- generate a prerequisite trigger for an unmet prerequisite of a selected action associated with a given trigger, wherein the prerequisite trigger invokes a first elasticity rule and the given trigger invokes a second elasticity rule; and
- execute a first action specified by the first elasticity rule before a second action specified by the second elasticity rule.

21. The network node of claim 12, wherein the network node is further operative to:
- generate a follow-up trigger indicating that a selected action associated with a given trigger requires a follow-up action, wherein the given trigger invokes a first elasticity rule and the follow-up trigger invokes a second elasticity rule; and
- execute a first action specified by the first elasticity rule before a second action specified by the second elasticity rule.

22. The network node of claim 12, wherein the network node is further operative to: select a plurality of elasticity rules for a plurality of triggers including the triggers issued in response to the events, prerequisite triggers and follow-up triggers, wherein each prerequisite trigger is generated for an unmet prerequisite of one of the selected actions, and each follow-up trigger is generated for a follow-up action of one of the selected actions.

* * * * *